US 12,407,565 B2

(12) United States Patent
Derehag et al.

(10) Patent No.: US 12,407,565 B2
(45) Date of Patent: Sep. 2, 2025

(54) NETWORK DATA ANALYTICS FUNCTION WITH DYNAMIC EVENT REGISTRATION

(71) Applicant: Telefonaktiebolaget LM Ericsson (publ), Stockholm (SE)

(72) Inventors: Jesper Derehag, Kareby (SE); Åke Johansson, Pixbo (SE); Liye He, Gothenburg (SE); Rikard Larsson, Stenungsund (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 18/278,311

(22) PCT Filed: Nov. 29, 2021

(86) PCT No.: PCT/EP2021/083377
§ 371 (c)(1),
(2) Date: Aug. 22, 2023

(87) PCT Pub. No.: WO2022/179725
PCT Pub. Date: Sep. 1, 2022

(65) Prior Publication Data
US 2024/0129182 A1    Apr. 18, 2024

Related U.S. Application Data

(60) Provisional application No. 63/152,388, filed on Feb. 23, 2021.

(51) Int. Cl.
*H04L 41/0686* (2022.01)
*H04L 41/0895* (2022.01)
*H04L 41/14* (2022.01)

(52) U.S. Cl.
CPC ...... *H04L 41/0686* (2013.01); *H04L 41/0895* (2022.05); *H04L 41/14* (2013.01)

(58) Field of Classification Search
CPC . H04L 41/0686; H04L 41/0895; H04L 41/14; H04L 41/082; H04L 43/06;
(Continued)

(56) References Cited

U.S. PATENT DOCUMENTS

2019/0356558 A1\* 11/2019 Han ............... H04L 41/14
2020/0228420 A1\* 7/2020 Dao ............... H04L 41/142
(Continued)

FOREIGN PATENT DOCUMENTS

WO    WO-2019197467 A1 \* 10/2019 ........... H04L 41/14
WO    WO-2020098951 A1 \*  5/2020 ........... G06F 16/164
(Continued)

OTHER PUBLICATIONS

International Search Report and Written Opinion with Transmittal dated Mar. 16, 2022 issued in International Patent Application No. PCT/EP2021/083377 (11 pages).
(Continued)

*Primary Examiner* — Oanh Duong
(74) *Attorney, Agent, or Firm* — Rothwell, Figg, Ernst & Manbeck, P.C.

(57) ABSTRACT

A system for network data analytics comprising a network data analytics function, NWDAF, and one or more network functions, NF, wherein the NWDAF is arranged to obtain a dynamic event definition, wherein the dynamic event definition defines a custom data analytics function for processing data, and register the dynamic event definition at the one or more NFs, where an NF is associated with one or more NF entrypoints for the data, wherein at least one of the NFs is arranged to receive the dynamic event definition from the NWDAF, verify the dynamic event definition in accordance with one or more pre-determined verification criteria, and, if the verification criteria are fulfilled: assign an identifier to the received dynamic event definition, transmit the identifier
(Continued)

back to the NWDAF, and register the dynamic event definition in an event definition store of the NF, wherein the NWDAF is arranged to receive the identifier associated with the registered dynamic event definition from the at least one NF.

6 Claims, 4 Drawing Sheets

(58) Field of Classification Search
CPC ... H04L 41/0806; H04L 41/40; H04L 41/147; H04L 43/028; H04L 43/0852; H04L 43/16; H04W 24/08
See application file for complete search history.

(56) References Cited

U.S. PATENT DOCUMENTS

| | | | |
|---|---|---|---|
| 2021/0367854 A1* | 11/2021 | Lee | H04L 41/5058 |
| 2022/0124160 A1* | 4/2022 | Shariat | H04L 41/50 |
| 2023/0147094 A1* | 5/2023 | Kahn | H04L 41/5054 |
| | | | 726/27 |

FOREIGN PATENT DOCUMENTS

| | | | | | |
|---|---|---|---|---|---|
| WO | WO-2020104969 A1 | * | 5/2020 | ......... | H04L 41/0896 |
| WO | WO-2021019498 A1 | * | 2/2021 | ............ | H04L 41/14 |
| WO | WO-2021155090 A1 | * | 8/2021 | ............ | H04W 24/04 |
| WO | WO-2022080962 A1 | * | 4/2022 | ............ | H04L 41/12 |

OTHER PUBLICATIONS

3GPP TR 23.791 V16.2.0, Jun. 2019, Technical Report, 3rd Generation Partnership Project; Technical Specification Group Services and System Aspects; Study of Enablers for Network Automation for 5G (Release 16), XP051751789 (124 pages).
3GPP TR 23.700-91 V17.0.0, Dec. 2020, Technical Report, 3rd Generation Partnership Project; Technical Specification Group Services and System Aspects; Study on enablers for network automation for the 5G System (5GS); Phase 2 (Release 17), XP051999941 (382 pages).
Wu, Z. et al., "Swift: A Fast Dynamic Packet Filter", Jan. 2008, ResearchGate, https://www.researchgate.net/publication/220831931 (15 pages).
3GPP TS 23.288 V16.5.0, Sep. 2020, Technical Specification, 3rd Generation Partnership Project; Technical Specification Group Services and System Aspects; Architecture enhancements for 5G System (5GS) to support network data analytics services (Release 16) (66 pages).
3GPP TS 23.288 V16.6.0, Dec. 2020, Technical Specification, 3rd Generation Partnership Project; Technical Specification Group Services and System Aspects; Architecture enhancements for 5G System (5GS) to support network data analytics services (Release 16) (67 pages).
McCanne, S. et al., "The BSD Packet Filter: A New Architecture for User-level Packet Capture", Dec. 19, 1992, BPF (11 pages).

* cited by examiner

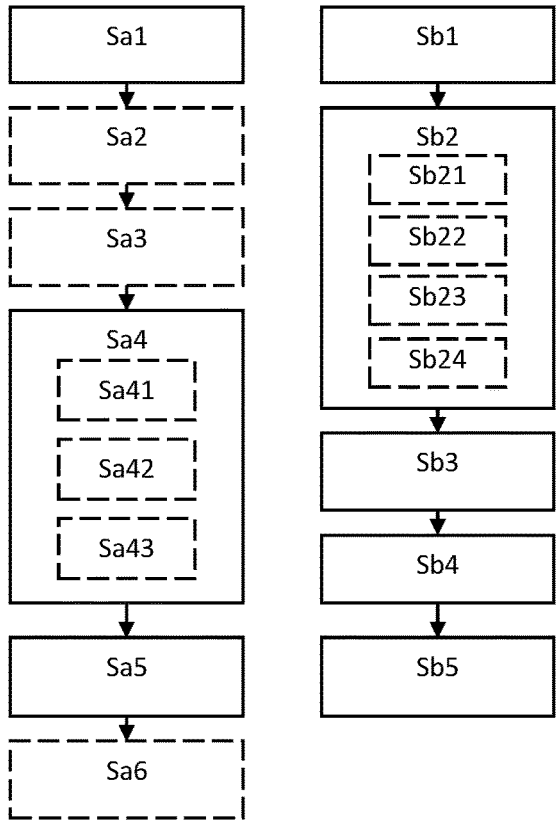
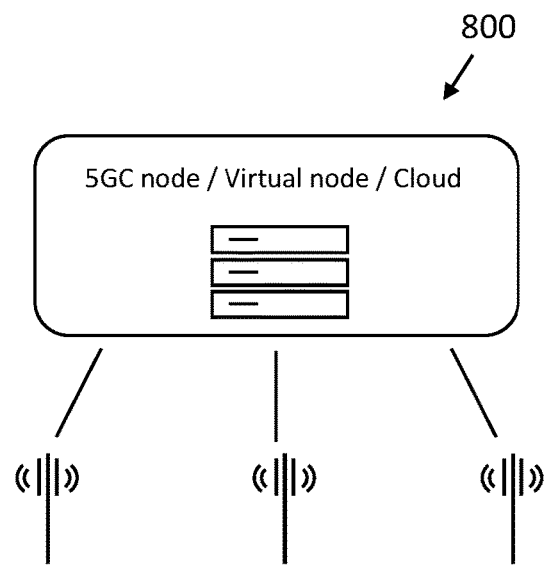
FIG. 7A    FIG. 7B
FIG. 8
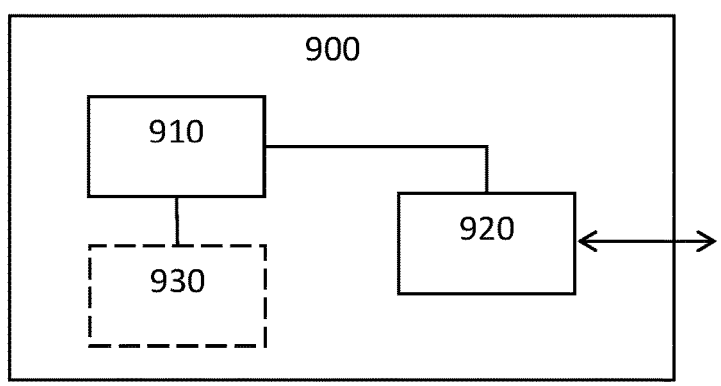
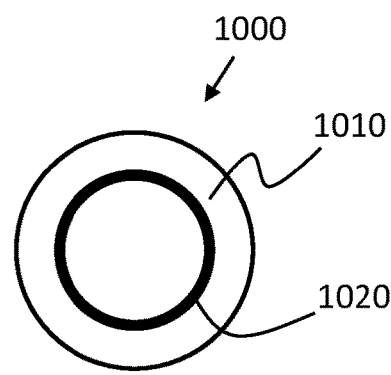
FIG. 9
FIG. 10

NETWORK DATA ANALYTICS FUNCTION WITH DYNAMIC EVENT REGISTRATION

CROSS REFERENCE TO RELATED APPLICATIONS

This application is a 35 U.S.C. § 371 National Stage of International Patent Application No. PCT/EP2021/083377, filed Nov. 29, 2021, which claims priority to U.S. provisional application No. 63/152,388, filed Feb. 23, 2021, which is incorporated by this reference.

TECHNICAL FIELD

The present disclosure relates to network data analytics functions (NWDAF) which facilitate gathering of data from wireless and wireline communication networks. The data may be indicative of certain events which have occurred and/or a frequency of events, i.e., various counters and the like. There are disclosed methods, network nodes, and network management tools for data collection, as well as computer programs and computer program products configured for facilitating network data analytics.

BACKGROUND

As part of the standardization of the fifth generation core (5GC) by the third generation partnership program (3GPP), the network data analytics function (NWDAF) was proposed as an interoperable network analytics function. In essence, the NWDAF allows a data consumer to subscribe to well-defined events from network functions (NF) (or other analytic functions) and provide data analytics support to a subscriber regarding these events. For example, an analytics function may comprise providing user equipment (UE) mobility prediction to an NWDAF consumer.

The NWDAF function is described in detail in 3GPP technical specification (TS) 23.288 V16.6.0.

In the current NWDAF technical specification, a datapoint must either be standardized beforehand or considered for implementation in an NF. Thus, from a requirements perspective, an operator wishing to obtain data related to a new type of event (not defined in the standard or known to be implemented by the NF) will need to either push for new event definitions into the standard, or the NF manufacturers need to implement it as a non-standard implementation. In both cases the responsibility of defining and implementing new events are pushed from the operator to a third party. This situation is likely to lead to undesired inefficiencies and more cumbersome gathering of data.

There is a need for an improved NWDAF which is more flexible, and which is able to support more types of event definitions.

SUMMARY

It is an object of the present disclosure to provide improved NWDAFs, as well as associated network nodes and processing units.

The object is obtained by a computer implemented method, performed in a network node implementing a network data analytics function (NWDAF). The method comprises obtaining a dynamic event definition, wherein the dynamic event definition defines a custom data analytics function for processing data. The method also comprises registering the dynamic event definition at one or more network functions (NF), where each NF is associated with one or more entrypoints for the data, and receiving an identifier associated with the dynamic event definition from the NF.

The proposed NWDAF concept allows operators and other users to dynamically define events for data analytics as needed according to their own definitions. Thus, a more flexible and dynamic NWDAF is provided compared to what is available today. The present technique also allows for updating of events without having to deploy new software versions of the NF, which results in a more flexible system that can be adjusted continuously as the networks evolve overtime. The present technique furthermore enables more efficient packet filtering inside an NF, very close to the data source relevant for the data analytics. This reduces network overhead driven by network data analytics functions.

The NWDAF is preferably but not necessarily a network analytics function in accordance with the specification set out in 3GPP TS 23.288 V16.6.0.

According to aspects, the method also comprises verifying the dynamic event definition in accordance with one or more pre-determined verification criteria. This allows the NWDAF to make sure that no harmful code or other mechanisms which may have a negative impact on the network are introduced to the system, which is an advantage. As will be explained in the following, the verification may take place in the NF, and/or in the NWDAF. Verification can optionally also be performed by some other trusted third party authority specifically tasked with verifying event definitions.

According to aspects, the method comprises transcompiling or compiling the received dynamic event definition into a predetermined format. This allows for an efficient platform independent processing of the event definitions. This also allows for re-using event definitions across different systems, and also in different standards, which is an advantage.

According to aspects, the registering comprises transmitting the dynamic event definition to the NF as a program code. For instance, a byte-code such as extended Berkeley packet filter (eBPF) or Swift may be used for efficient platform-independent processing of the event definition.

According to aspects, the registering comprises specifying an entrypoint of the NF to be associated with the dynamic event definition. It is appreciated that the same event definition applied to different types of data in the system will give rise to different analytical data output. Thus, it is an advantage that entrypoints may be specified for each event definition. An NF may furthermore publish its available entrypoints which can be used for data analytics. This increases the freedom for an operator to define different events for data analytics. The registering may also comprise specifying a point of interest at the NF to be associated with the dynamic event definition, wherein the point of interest is related to the data.

An NF may provide manual pages or the like upon request where the currently available entrypoints and other points of interest are listed, along with descriptions regarding their particular details.

According to aspects, the method comprises subscribing to an event according to an event specification and/or a counter associated with the dynamic event definition. Thus, the NWDAF can obtain data for further analysis. The dynamic event definition may define both NWDAF periodic events as well as NWDAF threshold triggered events.

Aspects of the present disclosure also refers to a computer implemented method, performed in a network node implementing a network function, NF, wherein the NF is associated with one or more entrypoints of data. Such aspects of methods comprise; receiving a dynamic event definition registration request from a network data analytics function, NWDAF, wherein the dynamic event definition defines a custom data analytics function for processing the data, verifying the dynamic event definition in accordance with one or more pre-determined verification criteria. Further, if the verification criteria are fulfilled: assigning an identifier to the received dynamic event definition, transmitting the identifier back to the NWDAF, and registering the dynamic event definition in an event definition store of the NF.

Aspects of the present disclosure also refer to a system for data analytics, network nodes configured to execute methods of the disclosure and computer programs, computer program products and computer readable means.

BRIEF DESCRIPTION OF THE DRAWINGS

The present disclosure will now be described in more detail with reference to the appended drawings, where:

FIGS. 7A-B are flow charts illustrating methods;

FIG. 8 schematically illustrates a core network function;

FIG. 9 schematically illustrates processing circuitry; and

FIG. 10 shows a computer program product.

DETAILED DESCRIPTION

Figure 1:
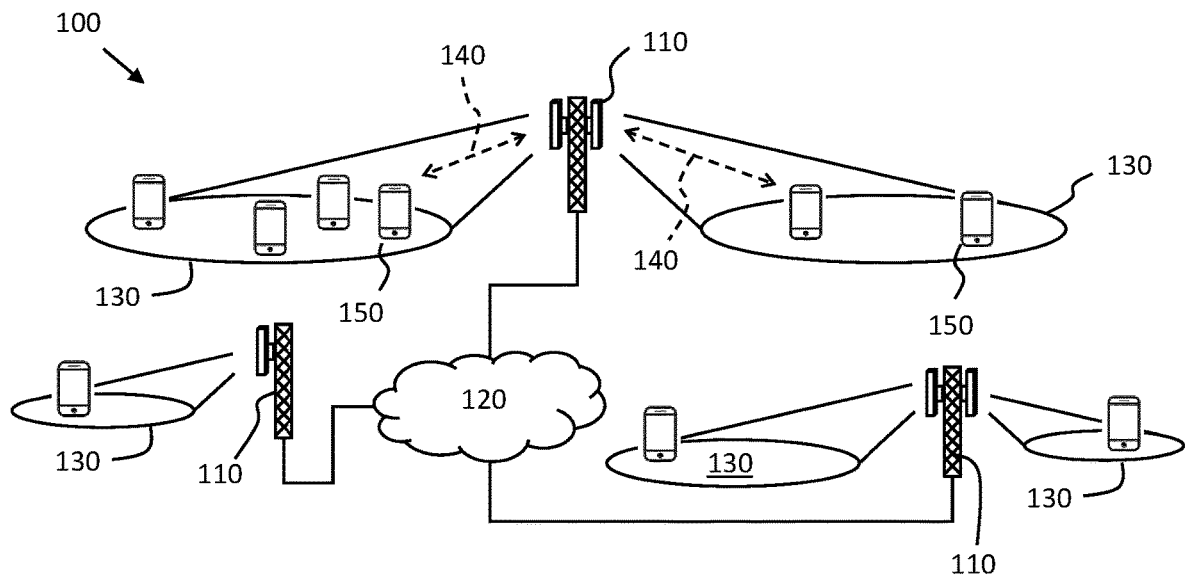
FIG. 1 shows an example communication network built around a core network.

Aspects of the present disclosure will now be described more fully hereinafter with reference to the accompanying drawings. The different devices, systems, computer programs and methods disclosed herein can, however, be realized in many different forms and should not be construed as being limited to the aspects set forth herein. Like numbers in the drawings refer to like elements throughout.

The terminology used herein is for describing aspects of the disclosure only and is not intended to limit the invention. As used herein, the singular forms "a", "an" and "the" are intended to include the plural forms as well, unless the context clearly indicates otherwise.

FIG. 1 schematically illustrates an example communication system 100 comprising radio access network nodes 110 which provide wireless access 140 over a plurality of coverage areas 130. The radio access network nodes are connected to a core network 120. Wireless devices 150 of different types connect to the core network 120 via the radio access network nodes 110.

The communication system may be part of a fifth generation (5G) communication system (5GS) as defined by the 3GPP. However, the techniques disclosed herein are generally applicable, and can be implemented in other communication systems also, such as a 3GPP fourth generation (4G) system.

Figure 2:
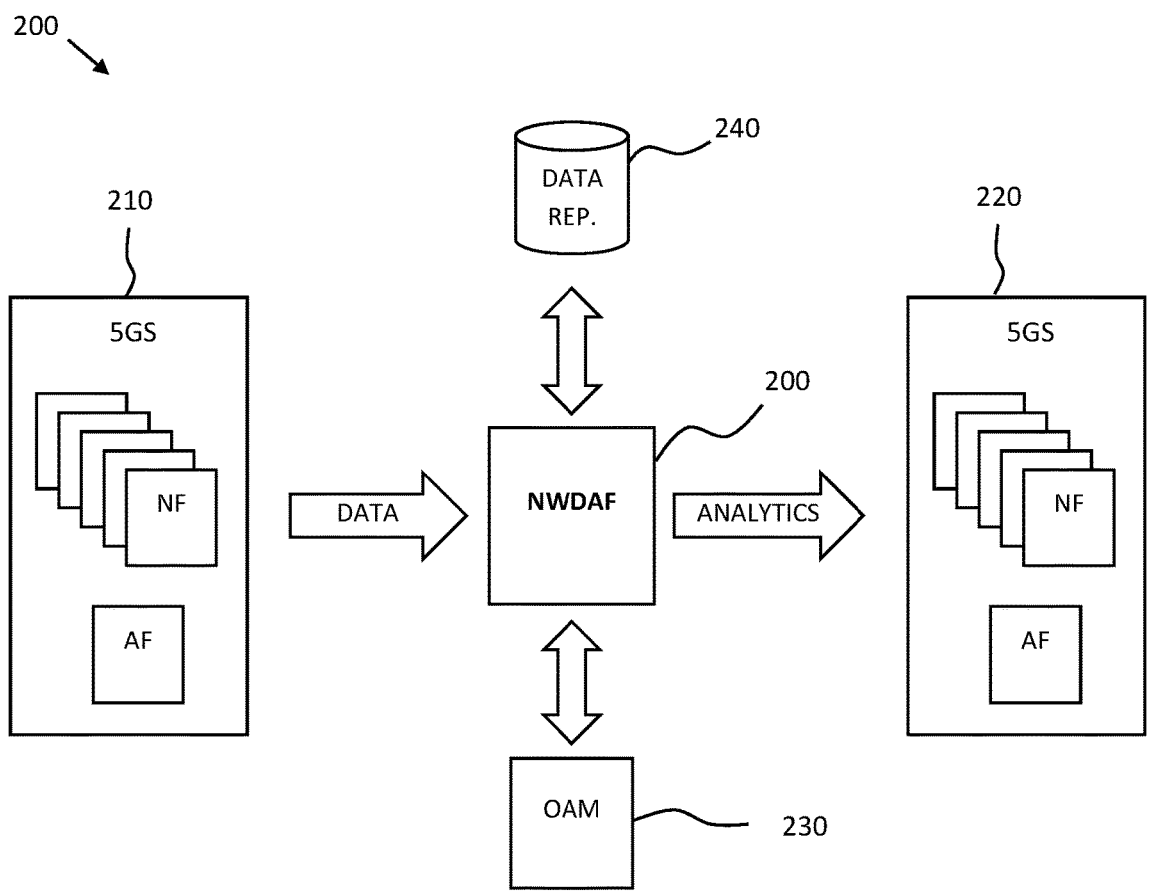
FIG. 2 schematically illustrates an NWDAF system from a functional perspective.

An operator wishing to obtain data for analysis of the operations, events, and status, in the system 100 may use the network data analytics function (NWDAF) described in, e.g., 3GPP TS 23.288 V16.6.0, and schematically illustrated in FIG. 2. A target 5G system (5GS) 210 (where the data of interest for the analysis is generated) comprises a number of network functions (NF) and one or more application functions (AF). Some example NFs comprise User Plane Functions (UPF), Access and Mobility Management Functions (AMF), and Session Management Functions (SMF).

Various analytical functions related to the operational data of the 5GS can be subscribed to by the NWDAF 200 as detailed in 3GPP TS 23.288 V16.6.0. This data is then made available to an NWDAF consumer which can be some other 5GS 220, an operations and maintenance (OAM) function 230, and/or a data repository 240.

For instance, an operator may desire to measure the latency (time delay) between a first network-related event and a second network-related event. For instance, an operator may be interested in an analysis of the time it takes from a time instant when a wireless device first connects to the 5GS 210 until some specific type of message is sent, or some other event of interest takes place. If there is no counter for this particular data analysis pre-defined at the NF, then the operator may need to stream all generated messages of some relevant type and process them by the NWDAF. This is of course highly inefficient.

As another example, in a 4G system, an operator may want to measure the latency (time delay) between an initial attach by a wireless device to the first traffic area update for a particular device type. In case no such counter exists a-priori in the NF, the operator would need to stream all general packet radio service (GPRS) tunneling protocol (GTP) messages to the NWDAF and then tediously compute this latency from those messages. This is of course again highly inefficient, at least in part since it generates significant network overhead signaling.

The present disclosure proposes to instead let an operator or other entity define events dynamically, e.g., by computer program code or other unambiguous means of event definition, and then send these event specifications to the NF along with a well-defined data entrypoint where the relevant data is to be accessed, such as a socket or some data structure internal to the NF. The NF is then unambiguously instructed by the event definition to gather analytical data and also which data source to use when gathering the analytical data, which the NWDAF can then subscribe to by referring to the event definition.

For example, the event definition may specify the occurrence of some event, such as an operation performed by some type of wireless device. An event definition may also relate to a counter, such as a counter which counts the number of times something happens in a given time period. It is appreciated that the event definition defines not only a given data analytics function, which is to be computed, but also the data which is to be used as input to the function. It is understood that the output of the data analytics functions depends on both the function to be computed per se, as well as the input data source to be used by the function.

This proposal extends the NWDAF Event Exposure application programming interface (API) as described in 3GPP TS 23.288 V16.6.0, by adding a new procedure to install arbitrary but well-defined programs inside the NF. The purpose of these programs is to generate analytical data, either based on specifying events which are to be reacted to by generating a notification or as counters which keep track of the number of times something happens in the 5GS, that would then be subscribed to by the NWDAF and later forwarded to some NWDAF consumer 220, 230, 240. Other forms of analytical functions may also be of interest, such as mean values, variances, or the results of pattern matching algorithms. In fact, arbitrary functions are supported by this concept, as long as they can be executed without disturbing the general operations of the NF.

For instance, with reference to the above example involving latency in a 4G system, instead of streaming all the GTP messages, an operator can write a small C program that parses GTP, checks against the device type and calculates the latency between an initial attach by a wireless device to the first traffic area update by the device. This C program code is then transpiled into, e.g., extended Berkeley packet filter code (eBPF), where the transpilation could occur either in the users own computer or inside the NWDAF. The Berkeley packet filter was originally described by McCanne and Jacobson in "The BSD Packet Filter: A New Architecture for User-level Packet Capture" 1992-12-19. An alternative to the BPF could be, for instance, the Swift code, introduced by Wu Zhenyu, Xie Mengjun and Wang Haining in "Swift: A Fast Dynamic Packet Filter" 2008. Although this disclosure is not limited to any particular form of event definition code per se, the eBPF mechanisms have been found suitable for this type of application. A similar approach can be used in the 5GS 210.

When the NWDAF has obtained the event definition, such as an eBPF bytecode, it proceeds to register the new program in the NF by referring to the entrypoint (in the 4G latency example, the GTP socket for the s11ap interface would be suitable as entrypoint). As part of the registration procedure, the NF first verifies the program, and if proven correct and allowable, it will return a unique event identifier identifying that exact eBPF program along with its entrypoint. The NWDAF can then subscribe to the 'latency' event like any other event, for example using an NF generated EventId procedure based on the identification associated with the event definition reported back to the NWDAF from the NF.

Figure 3:
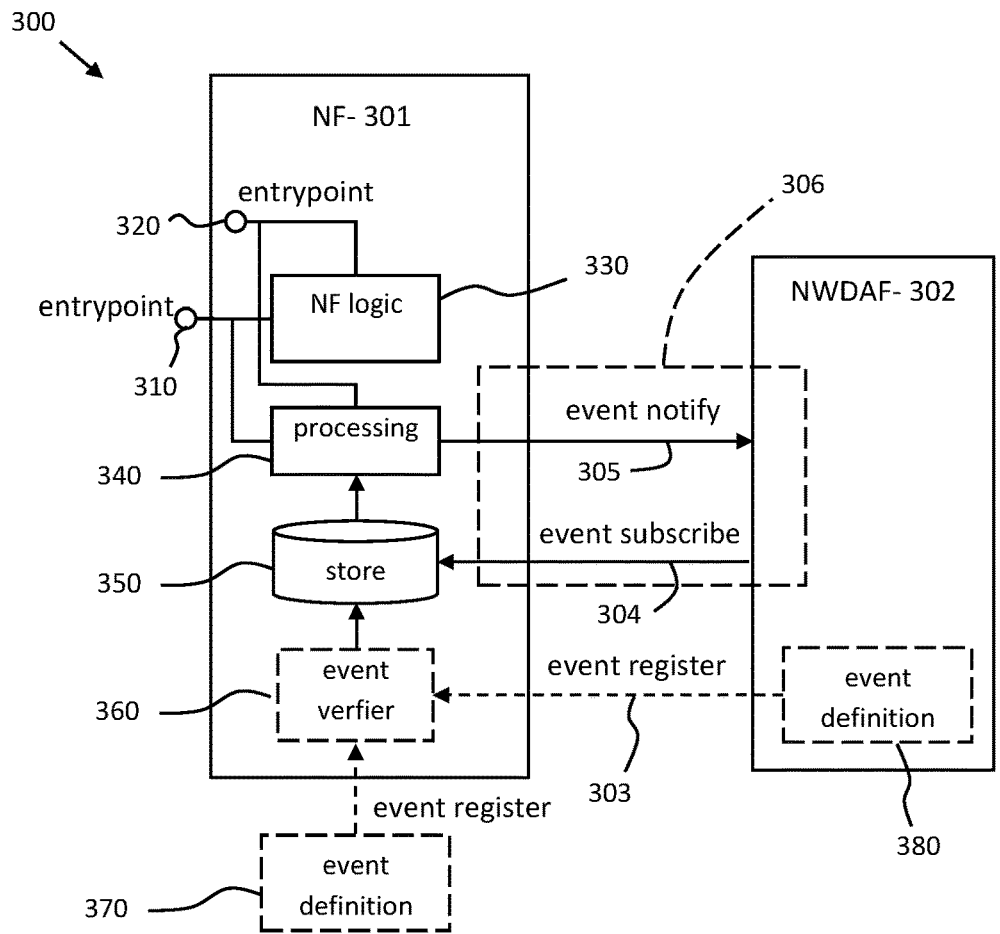
FIG. 3 shows a general event definition procedure.

FIG. 3 illustrates a data analytics system 300 according to a general example of the concepts disclosed herein. An NF 301 has at least one entrypoint 310, 320. This entrypoint may, e.g., be a socket 310 or some other well-defined point of interest 320 internal to the NF, such as a data structure, array, variable name, or location in memory.

The NF 301 comprises some form of NF logic 330 which implements the normal day-to-day operations performed by the NF 301. The entrypoint 310, 320 is normally associated with this NF logic 330 in some way. For example in the Linux Kernel, BPF programs are commonly attached to known entrypoints and set to process the payload of those entrypoints. For example, one might attach a BPF program to a RAW socket, and thus obtain a pointer to the full packet inside the BPF program. However, since NFs may have arbitrary implementation details, one must instead standardize reasonable entrypoints along with their respective payloads. One such reasonable point of interest would of course be external sockets with their corresponding names. Another may be some standardized representation of a UE context such that the BPF program knows how to interpret each field. As mentioned above, entrypoints may very well also identify some point of interest internal to the NF, such as a well-defined data structure or other location inside the NF logic 330. A socket or interface is quite natural in terms of what the "input" data is to the event definition code (it is essentially a copy of a packet), while other points of interest may require more extensive documentation in order to provide an unambiguous entrypoint for data.

The NF 301 optionally implements a function where data related to the available entrypoints and other places of interest can be read from an external entity, such as the NWDAF. The NWDAF or other external entity can then compose suitable event definitions making use of the available entrypoints. This would be akin to a publication of manual pages for a set of functions, where a manual page describes the function and how to use it properly in order to obtain some desired result.

One example entrypoint of an NF is related to authentication. When a user is authenticated, be it through local policy, radius server, policy control function (PCF) or the like, it is possible to define an entrypoint when a user is authenticated. The input data to that entrypoint would be something like source authenticator (radius or whatever), result, international mobile International Mobile Subscriber Identifier (IMSI), and the like. The event definition could comprise some function of this data, or just a trigger to send an event notification when some specified event occurs.

Another example entrypoint of an NF is related to user plane function (UPF) selection. When a user gets assigned a UPF, one entrypoint could be at the response, what UPF was selected, why, etc.

There could of course be an arbitrary number of other points of interests, but of course these needs to be negotiated on the standardization level.

Also, one might consider solutions where the NF publishes arbitrary entrypoints towards the NWDAF, and where the user needs to read through the documentation of the NF to determine what a given entrypoint actually exposes. An NF may then regularly update a table or database with its currently supported entrypoints, along with manual pages describing the data which is accessible through these entrypoints. This would enable an operator seeking to perform some form of data analysis to find a suitable entrypoint and design an event definition which generates the desired result based on the data possible to obtain at the entrypoint.

With reference to FIG. 3, an operator or other entity first provides an event definition 370, 380. This event definition may be sent 303 to the NF directly from the NWDAF 302 as an event register message 303, or from some other network entity 370 external to the NF, such as an OAM function or the like. This event definition if optionally verified 360 by the NF, as will be discussed in more detail below, before being added to an event definition store 350 comprising verified event definitions. Following this event registration, the NWDAF 302 may subscribe 304 to events in the store 350. The processing unit 340 then performs data analytics according to the event definition and transmits event notifications 305 according to the event definition, at least if the NWDAF has subscribed to the newly registered event. It is noted that the "event subscribe" and "event notify" mechanisms are similar to those already defined in 3GPP TS 23.288 V16.6.0, thus, these parts are legacy parts already available to an operator. However, by this new addition, the network operator can define custom data analytics functions as needed without having to first standardize those custom functions or have them implemented as proprietary functions in the NF 301.

The event definitions currently in the store 350 at some NF may be published regularly by the NF in a manner similar to the manual pages of a Unix or Linux system. An external user can then request a listing of the currently registered event definitions along with the information about how to use them, e.g., what identifiers to use for subscribing and so on.

This way, a dynamic event definition associates itself with some interface or other point of interest at the NF 301, where it may gather data related to the interface or other point of interest. The interface can, for example, be a socket of some sort. The dynamic event definition can also associate itself to places internal to the NF. The requirement of course, being that this point of interest can be defined unambiguously and such that the event definition code (if it is a code) can be constructed to obtain the desired data analytics.

Having outside parties executing code as part of the NF execution context may result in unexpected and undesired consequences. The event definitions should of course be efficient in order to not impact the normal execution of the NF, or at the very least it must have predictable execution time. The event definitions are also desired to have provable boundaries with respect to e.g., occupied memory and execution time such that it will not consume too much memory or end up blocking the NFs from serving UEs. An event definition should of course also be secure in the sense that programs should not be able to inspect NF business logic or to gain privileged access. I.e., it must only be possible to access the data at the entrypoint and nothing else. An event definition should of course also be portable such that it would be able to execute on almost any hardware the NF happens to be running on.

The NWDAF event exposure API differentiates between events being either "PERIODIC" or "THRESHOLD" triggered. The dynamic event definition could potentially be configured in a similar fashion but would be viewed as a layered approach. Typical eBPF programs are normally event driven in the sense that given some input, it will either trigger some output, or not. This would normally map poorly to sampling approaches like PERIODIC events in NWDAF. However, eBPF does allow you to hold a global context over multiple invocations, allowing you to hold for instance lookup tables for counters etc. This means that from an eBPF program perspective, you could increment some counter in this global structure. That global structure is then queried from outside the BPF virtual machine with some frequency, allowing NFs to also support PERIODIC dynamic events. Any dynamic event may have bytecode that filters events based on for example threshold or any other arbitrary criteria, but that would be viewed as part of the event implementation. The typical threshold-based filtering of events as part of the event exposure configuration would thus be done on the outer NF level (rather than inside the dynamic event). In other words, thresholding can be done separately on either level.

Figure 4:
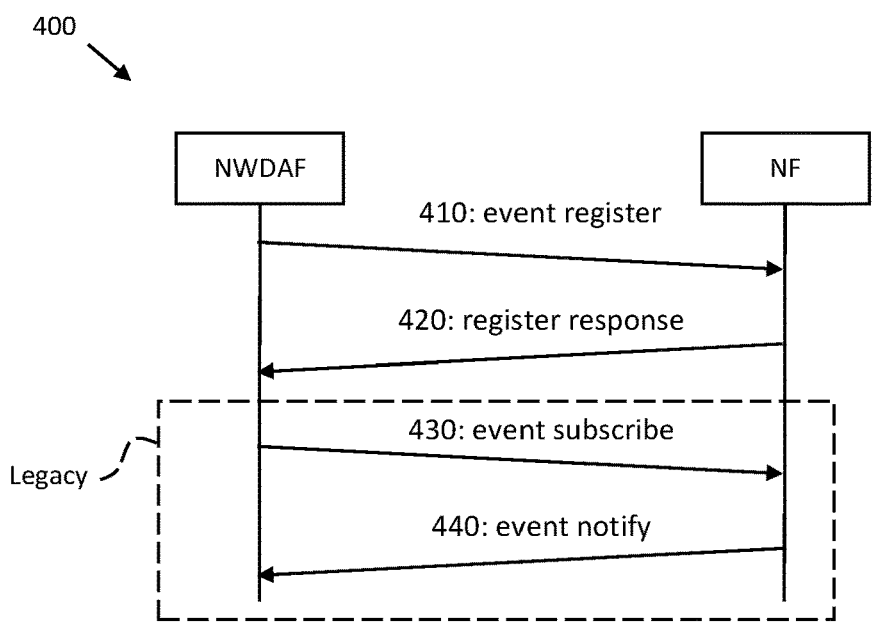
FIG. 4 is a signaling chart illustrating a general event definition procedure.

FIG. 4 illustrates the general process in terms of the signaling 400 taking place between the NWDAF and an NF. The NWDAF first registers 410 an event definition by the NF, to be used for data analytics. The event definition describes what type of data is to be collected, how it is to be computed in case computation is required, and how it is to be formatted in the report back to the NWDAF. Upon receiving and registering the event definition, the NF submits a register response 420 back to the NWDAF. This register response indicates, e.g., if the event definition has been successfully registered and if so, an identification associated with the event definition. In case something went wrong, perhaps a failed verification of transpilation/compilation error, an error code can be submitted back to the NWDAF with the register response 420. An error code can also be generated and sent back to the NWDAF is the specified entrypoint does not exist at the NF receiving the event register message. Following the reception of the register response message 420, the NWDAF can go ahead and subscribe to the new event as per the current standard set out in 3GPP TS 23.288 V16.6.0, i.e., using the event subscribe 430 and event notify 440 mechanisms described in 3GPP TS 23.288 V16.6.0.

To summarize, FIGS. 3 and 4 illustrate a system for network data analytics comprising a network data analytics function (NWDAF) and one or more network functions (NF). The NWDAF is arranged to obtain a dynamic event definition, wherein the dynamic event definition defines a custom data analytics function for processing data, which may be some type of event specification and/or a definition of a counter. The NWDAF is also arranged to register the dynamic event definition at the one or more NFs, where each NF is associated with one or more entrypoints of the data, such as sockets or internal well-defined points of interest. The NWDAF is furthermore arranged to receive an identifier associated with the dynamic event definition back from the NF.

At least one of the NFs is arranged to receive the dynamic event definition registration from the NWDAF, verify the dynamic event definition in accordance with one or more pre-determined verification criteria, and, if the verification criteria are fulfilled: assign an identifier to the received dynamic event definition, transmit the identifier back to the NWDAF, and register the dynamic event definition in an event definition store of the NF.

Figure 5:
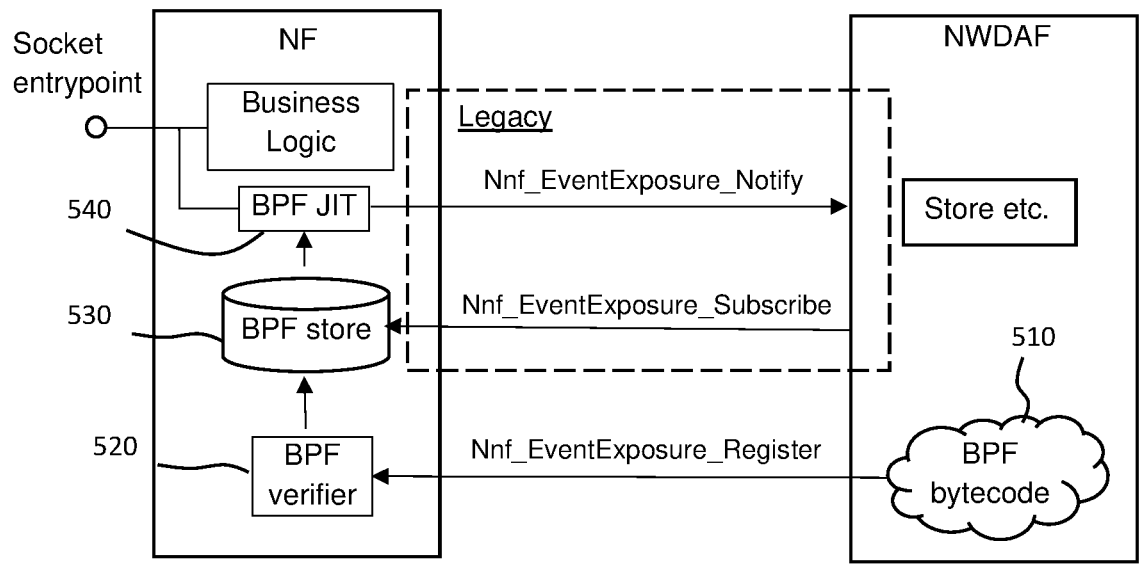
FIG. 5 shows an example event definition procedure.

FIG. 5 illustrates a more detailed example of the proposed data analytics technique proposed herein. This example is based on the use of BPF bytecode or eBPF bytecode to define the desired data analytics functions to be executed at the NF. A user first adds the BPF bytecode 510 to the NWDAF, which then registers the BPF program in the NF dynamic event store (BPF store) 530. The register message comprises transmitting an Nnf_EventExposure_Register message from the NWDAF to the NF as shown in FIG. 5.

The NF will first verify 520 the program prior to adding it to the store 530. This step is optional. For instance, it can be replaced by a certification function where certain event definitions have been verified a-priori and thus deemed safe for execution at a given type of NF. Nevertheless, if the program is verified to, e.g., not exceed size or computational limits, the NF will send back a dynamic EventID to the NWDAF in its Register response (not shown in FIG. 5).

When the NWDAF has received the EventID, it can then proceed to subscribe to the new EventID, according to the legacy EventExposure_Subscribe procedure. The first subscription to a dynamic EventID will attach the BPF program to its associated entrypoint, and the BPF program will then start to generate events. The NWDAF registers the new event definition, using the eBPF bytecode and its corresponding entrypoint. The NF will assign a per NF instance unique EventId and send it back in the response. The new EventId can then be subscribed to as any other EventId. The example in FIG. 5 uses a BPF just-in-time compiler (JIT) 540, although this is not mandatory since other implementation options also exist.

Figure 6:
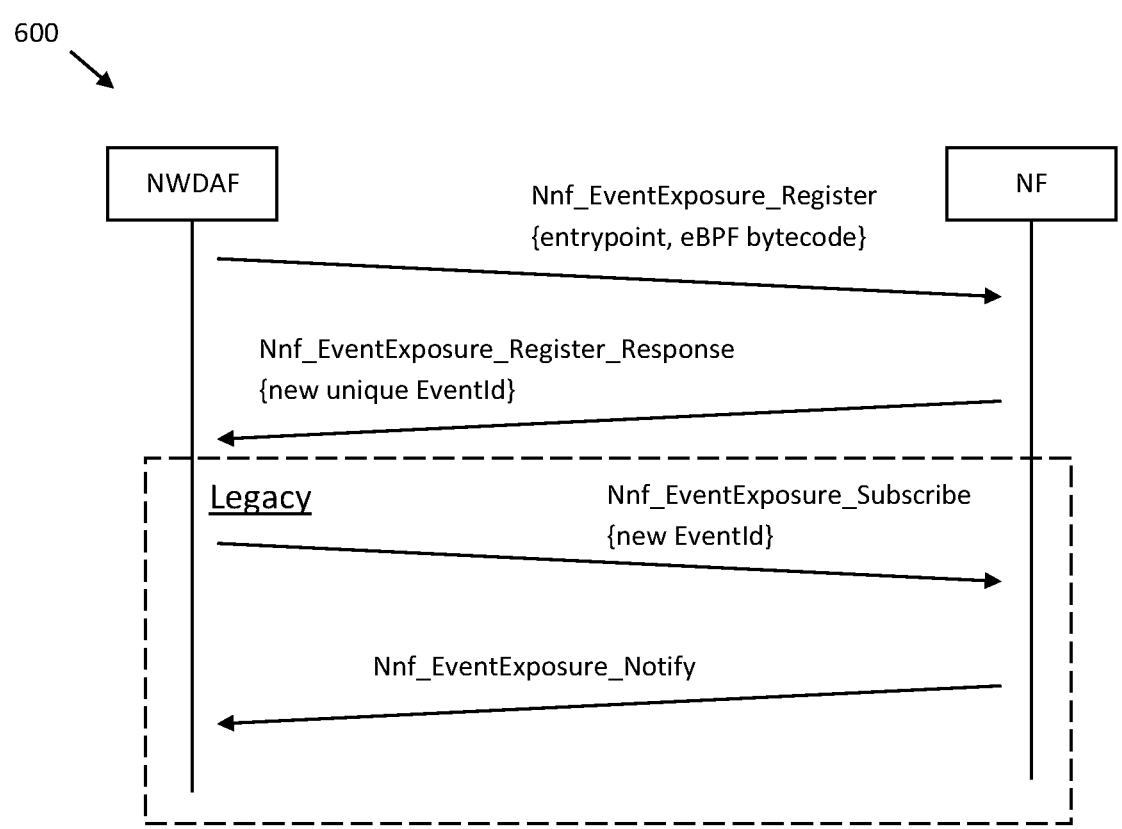
FIG. 6 is a signaling chart illustrating an example event definition procedure.

FIG. 6 shows the process in FIG. 5 as a signaling chart 600 which illustrates messaging between an NWDAF and an NF. The NWDAF first sends the Nnf_EventExposure_Register message, which defines the entrypoint to which the event definition is to be attached. This message also comprises the eBPF bytecode (if this is the chosen method of defining the event). If the registration is successful, the NF responds back with an Nnf_EventExposure_Register_Response message which carries a new unique EventID back to the NWDAF. Given this new EventID, the NWDAF can proceed to subscribe to the event and receive notifications just like in the NWDAF function described in 3GPP TS 23.288 V16.6.0.

FIGS. 7A and 7B are flow charts illustrating methods which summarize the above discussions. FIG. 7A illustrates a computer implemented method, performed in a network node 800, 900 implementing the type of network data analytics functions (NWDAF) discussed herein. The method comprises obtaining Sa1 a dynamic event definition, wherein the dynamic event definition defines a custom data analytics function for processing data, such as a specification of a particular event of interest and/or a definition of a counter. Other analytical functions are of course also possible to specify. The method also comprises registering Sa4 the dynamic event definition at one or more network functions (NF) where each NF is associated with one or more NF entrypoints for the date, as discussed above. The method also comprises receiving Sa5 an identifier associated with the dynamic event definition back from the NF. This receiver acts like a pointer to the transmitted event definition and can be used to subscribe to the output generated by the event definition.

The method optionally comprises verifying Sb2 the dynamic event definition in accordance with one or more pre-determined verification criteria. This verification may be performed internally by the NF, as discussed above. Alternatively, or as a complement, the verification can be performed by some trusted third party which then issues a certificate which indicates that the event definition is safe to execute without impact to the NF function, or security policy. An event definition having this type of certificate will then pass the verification automatically, i.e., the certificate may in itself be a verification criterion.

The method may also comprise transcompiling or compiling Sb3 the received dynamic event definition into a predetermined format. For instance, the dynamic event definition may be in the form of an eBPF program which the NF can use by, e.g., JIT to process the data according to the event definition.

The registering may, e.g., comprise transmitting Sa41 the dynamic event definition to the NF. This means that a code snippet or other detailed instruction is sent to the NF, which the NF then can interpret without ambiguity. However, the dynamic event definition may also be in the form of a code which identifies a certain event definition which the NF then proceeds to obtain from some other network entity, like a repository of some sort.

The registering optionally comprises specifying Sa42 an entrypoint of the NF to be associated with the dynamic event definition. Entrypoints were discussed above. Generally, an entrypoint defines the input to the data analytics function defined in the event definition. An entrypoint may, for instance, be a socket or other place of interest, such as a data structure, which can be identified without ambiguity. In case the entrypoint is a RAW socket, the event definition may obtain access to unprocessed data arriving at or exiting from the NF. An entrypoint may also be some well-defined flag inside the NF, or other accessible signal. As mentioned above, the NF may publish its available entrypoints along with manual pages describing the data available at the respective entrypoints. This allows an operator to read the manual pages and then design data analytics functions which generate the desired result. Thus, according to some aspects, the registering also comprises specifying Sa43 a point of interest associated with the NF to be associated with the dynamic event definition. This feature allows for more advanced data analytics functions can be defined and executed, which is an advantage.

The method may, as discussed above, also comprise subscribing Sa6 to an event associated with the dynamic event definition. Thus, the NWDAF is now able to specify events and define counters which it may be interested in on a more dynamic basis. If the event or counter is not already present at the NF, then the NWDAF can define this event or counter as a new event definition and register it by the NF. Following successful registration, the NWDAF can subscribe to the event just like if it had been defined a-priori. This means that the network data analytics becomes more dynamic and easier to work with compared to the case where a limited set of events are pre-defined without any chance of dynamically adding new events.

The dynamic event definition may define an NWDAF periodic event and/or an NWDAF threshold triggered event.

FIG. 7B illustrates methods implemented at the NF side, i.e., by the NF 301 in FIG. 3 or the NF discussed in connection to FIG. 5 above. The flow chart illustrates a computer implemented method, performed in a network node implementing a network function (NF). The NF is associated with one or more entrypoints for data such as interfaces and/or other points of interest for data analytics. The method comprises receiving Sb1 a dynamic event definition registration request from a network data analytics function (NWDAF), wherein the dynamic event definition defines a custom data analytics function for processing data. The method also comprises verifying Sb2 the dynamic event definition in accordance with one or more pre-determined verification criteria. This verification may, e.g., comprise any of a computational efficiency criteria Sb22, a boundary on execution time and/or on required memory resources Sb23 and/or a security criteria Sb24, wherein the security criteria is indicative of a data access associated with the dynamic event definition. If the verification criteria are fulfilled, the method comprises assigning Sb3 an identifier to the received dynamic event definition, transmitting Sb4 the identifier back to the NWDAF, and registering Sb5 the dynamic event definition in an event definition store of the NF.

The pre-determined verification criteria may be configured centrally according to a standard, or locally according to operator policy.

The method optionally comprises transmitting Sb21 an error message back to the NWDAF in case one or more of the verification criteria were not fulfilled.

FIG. 8 illustrates various realizations 800 of the methods discussed above. The methods and receivers discussed above may be implemented in a 5GC node which could be deployed in a centralized manner or in a virtual node in the communications network 100. The split between the physical node and the centralized node can be on different levels. Parts of the proposed methods may of course also be implemented on a remote server comprised in a cloud-based computing platform.

FIG. 9 schematically illustrates, in terms of a number of functional units, the general components of a network node 900 according to embodiments of the discussions herein. Processing circuitry 910 is provided using any combination of one or more of a suitable central processing unit CPU, multiprocessor, microcontroller, digital signal processor DSP, etc., capable of executing software instructions stored in a computer program product, e.g., the form of a storage medium 930. The processing circuitry 910 may further be provided as at least one application specific integrated circuit ASIC, or field programmable gate array FPGA.

Particularly, the processing circuitry 910 is configured to cause the device 900 to perform a set of operations, or steps, such as the methods discussed in connection to FIGS. 7A and 7B and the discussions above. For example, the storage medium 930 may store the set of operations, and the processing circuitry 910 may be configured to retrieve the set of operations from the storage medium 930 to cause the device to perform the set of operations. The set of operations may be provided as a set of executable instructions. Thus, the processing circuitry 910 is thereby arranged to execute methods as herein disclosed. In other words, there is shown a network node 1900, comprising processing circuitry 910, a network interface 920 coupled to the processing circuitry 910 and a memory 930 coupled to the processing circuitry 910, wherein the memory comprises machine readable computer program instructions that, when executed by the processing circuitry, causes the network node to execute one or more of the operations, functions and methods discussed herein.

The storage medium 930 may also comprise persistent storage, which, for example, can be any single one or combination of magnetic memory, optical memory, solid state memory or even remotely mounted memory.

The device 900 may further comprise an interface 920 for communications with at least one external device. As such the interface 920 may comprise one or more transmitters and receivers, comprising analogue and digital components and a suitable number of ports for wireline or wireless communication.

The processing circuitry 910 controls the general operation of the device 900, e.g., by sending data and control signals to the interface 920 and the storage medium 930, by receiving data and reports from the interface 920, and by retrieving data and instructions from the storage medium 930. Other components, as well as the related functionality, of the control node are omitted in order not to obscure the concepts presented herein.

FIG. 9 is a schematic illustration of a network node 800, 900, comprising:
- processing circuitry 910;
- a network interface 920 coupled to the processing circuitry 910; and
- a memory 930 coupled to the processing circuitry 910, wherein the memory comprises machine readable computer program instructions that, when executed by the processing circuitry, causes the network node to:
- obtain a dynamic event definition, wherein the dynamic event definition defines a custom data analytics function for processing data which may, e.g., be an event specification and/or a definition of a counter,
- register the dynamic event definition at one or more network functions (NF), where each NF is associated with one or more entrypoints for the data, and
- receive an identifier associated with the dynamic event definition back from the NF.

FIG. 9 is also a schematic illustration of a network node 800, 900, comprising:
- processing circuitry 910;
- a network interface 920 coupled to the processing circuitry 910; and
- a memory 930 coupled to the processing circuitry 910, wherein the memory comprises machine readable computer program instructions that, when executed by the processing circuitry, causes the network node to:
- receive a dynamic event definition registration request from a network data analytics function (NWDAF), wherein the dynamic event definition defines a custom data analytics function for processing data comprising an event specification and/or a definition of a counter,
- verify the dynamic event definition in accordance with one or more pre-determined verification criteria, and, if the verification criteria are fulfilled:
- assign an identifier to the received dynamic event definition,
- transmit the identifier back to the NWDAF, and
- register the dynamic event definition in an event definition store of the NF.

FIG. 10 illustrates a computer readable medium 1010 carrying a computer program comprising program code means 1020 for performing the methods illustrated in, e.g., FIG. 9, when said program product is run on a computer. The computer readable medium and the code means may together form a computer program product 1000.

Further exemplary embodiments of the present disclosure are provided below:

Embodiment 1. A system for network data analytics comprising a network data analytics function, NWDAF, (302) and one or more network functions, NF, (301) wherein the NWDAF is arranged to
- obtain (Sa1) a dynamic event definition (370, 380), wherein the dynamic event definition defines a custom data analytics function for processing data, and
- register (Sa4) the dynamic event definition at the one or more NFs, where an NF is associated with one or more NF entrypoints for the data, wherein at least one of the NFs (301) is arranged to
- receive (Sb1) the dynamic event definition from the NWDAF (302),
- verify (Sb2) the dynamic event definition in accordance with one or more pre-determined verification criteria, and, if the verification criteria are fulfilled:
- assign (Sb3) an identifier to the received dynamic event definition,
- transmit (Sb4) the identifier back to the NWDAF (302), and
- register (Sb5) the dynamic event definition in an event definition store (350) of the NF, wherein the NWDAF (302) is arranged to receive (Sa5) the identifier associated with the registered dynamic event definition from the at least one NF (301).

Embodiment 2. A computer implemented method, performed in a network node (302, 800, 900) implementing a network data analytics function, NWDAF, the method comprising
- obtaining (Sa1) a dynamic event definition, wherein the dynamic event definition defines a custom data analytics function for processing data,
- registering (Sa4) the dynamic event definition at one or more network functions, NF, (301) where each NF is associated with one or more entrypoints for the data, and
- receiving (Sa5) an identifier associated with the dynamic event definition from the NF.

Embodiment 3. The method according to embodiment 2, comprising verifying (Sb2) the dynamic event definition in accordance with one or more pre-determined verification criteria.

Embodiment 4. The method according to embodiment 2 or 3, comprising transcompiling or compiling (Sb3) the received dynamic event definition into a predetermined format.

Embodiment 5. The method according to any of embodiments 2-4, wherein the registering comprises transmitting (Sa41) the dynamic event definition to the NF as a program code.

Embodiment 6. The method according to any of embodiments 2-5, wherein the registering comprises specifying (Sa42) an entrypoint of the NF to be associated with the dynamic event definition.

Embodiment 7. The method according to any of embodiments 2-6, wherein the registering comprises specifying (Sa43) a point of interest at the NF to be associated with the dynamic event definition, wherein the point of interest is related to the data.

Embodiment 8. The method according to any of embodiments 2-7, comprising subscribing (Sa6) to an event according to an event specification and/or a counter associated with the dynamic event definition.

Embodiment 9. The method according to any of embodiments 2-8, wherein the dynamic event definition defines an NWDAF periodic event.

Embodiment 10. The method according to any of embodiments 2-9, wherein the dynamic event definition defines an NWDAF threshold triggered event.

Embodiment 11. The method according to any of embodiments 2-10, wherein the NWDAF is a network analytics function in accordance with the specification set out in 3GPP TS 23.288 V16.6.0.

Embodiment 12. A computer program (1020) comprising program code means for performing the steps of any of embodiments 2-11 when said program is run on a computer or on processing circuitry (910) of a network node (800, 900).

Embodiment 13. A computer program product (1000) comprising a computer program (1020) according to embodiment 12, and a computer readable means (1010) on which the computer program is stored.

Embodiment 14. A computer implemented method, performed in a network node (301, 800, 900) implementing a network function, NF, the NF being associated with one or more entrypoints of data, the method comprising
  receiving (Sb1) a dynamic event definition registration request from a network data analytics function, NWDAF, wherein the dynamic event definition defines a custom data analytics function for processing the data,
  verifying (Sb2) the dynamic event definition in accordance with one or more pre-determined verification criteria, and, if the verification criteria are fulfilled:
  assigning (Sb3) an identifier to the received dynamic event definition,
  transmitting (Sb4) the identifier back to the NWDAF, and
  registering (Sb5) the dynamic event definition in an event definition store (350) of the NF.

Embodiment 15. The method according to embodiment 14, comprising transmitting (Sb21) an error message back to the NWDAF in case one or more of the verification criteria were not fulfilled.

Embodiment 16. The method according to embodiment 14 or 15, wherein the verification criteria comprise a computational efficiency criterion (Sb22).

Embodiment 17. The method according to any of embodiments 14-16, wherein the verification criteria comprise a boundary on execution time and/or on required memory resources (Sb23).

Embodiment 18. The method according to any of embodiments 14-17, wherein the verification criteria comprise a security criterion (Sb24), wherein the security criterion are indicative of a data access associated with the dynamic event definition.

Embodiment 19. The method according to any of embodiments 14-18, wherein the NWDAF (302) is a network data analytics function in accordance with the specification set out in 3GPP TS 23.288 V16.6.0.

Embodiment 20. A network node (302, 800, 900), comprising:
  processing circuitry (910);
  a network interface (920) coupled to the processing circuitry (910); and
  a memory (930) coupled to the processing circuitry (910), wherein the memory comprises machine readable computer program instructions that, when executed by the processing circuitry, causes the network node to:
  obtain a dynamic event definition, wherein the dynamic event definition defines a custom data analytics function for processing data,
  register the dynamic event definition at one or more network functions, NF, (301) where each NF is associated with one or more entrypoints of the data, and
  receive an identifier associated with the dynamic event definition from the NF.

Embodiment 21. A network node (301, 800, 900), comprising:
  processing circuitry (910);
  a network interface (920) coupled to the processing circuitry (910); and
  a memory (930) coupled to the processing circuitry (910), wherein the memory comprises machine readable computer program instructions that, when executed by the processing circuitry, causes the network node to:
  receive a dynamic event definition registration request from a network data analytics function, NWDAF, (302) wherein the dynamic event definition defines a custom data analytics function for processing data,
  verify the dynamic event definition in accordance with one or more pre-determined verification criteria, and, if the verification criteria are fulfilled:
  assign an identifier to the received dynamic event definition,
  transmit the identifier back to the NWDAF (302), and
  register the dynamic event definition in an event definition store (350) of the NF (301).

The invention claimed is:

1. A system for network data analytics comprising:
  a network data analytics function (NWDAF) comprising a memory and processing circuitry coupled to the memory; and
  a first network function (NF) comprising a memory and processing circuitry coupled to the memory, wherein the NWDAF is configured to:
    obtain a dynamic event definition defining a custom data analytics function for processing data; and
    register the dynamic event definition at the first NF,
  the first NF is arranged to:
    receive the dynamic event definition from the NWDAF;
    verify the dynamic event definition by determining whether one or more pre-determined verification criterions are fulfilled; and
    as a result of determining that the one or more verification criterions are fulfilled:
      assign an identifier to the received dynamic event definition;
      transmit the identifier to the NWDAF; and
      register the dynamic event definition in an event definition store of the NFs, and
  the NWDAF is further configured to receive the identifier associated with the registered dynamic event definition from the first NF.

2. A computer implemented method, performed in a network node implementing a network function (NF), the method comprising receiving a dynamic event definition registration request from a network data analytics function (NWDAF), wherein the dynamic event definition defines a custom data analytics function for processing the data;

verifying the dynamic event definition, wherein the verifying comprises determining whether one or more pre-determined verification criterions are fulfilled; and as a result of determining that the one or more verification criterions are fulfilled:
  assigning an identifier to the received dynamic event definition;
  transmitting the identifier to the NWDAF; and
  registering the dynamic event definition in an event definition store of the NF.

3. The method of claim 2, further comprising transmitting an error message to the NWDAF in case one or more of the verification criteria were not fulfilled.

4. The method of claim 2, wherein the verification criteria comprise a computational efficiency criterion.

5. The method of claim 2, wherein the verification criteria comprise a boundary on execution time and/or on required memory resources.

6. The method of claim 2, wherein the verification criteria comprise a security criterion, wherein the security criterion are indicative of a data access associated with the dynamic event definition.

\* \* \* \* \*